United States Patent
Coers et al.

(10) Patent No.: US 6,834,484 B2
(45) Date of Patent: Dec. 28, 2004

(54) AUTOMATIC CONTROL INITIATION FOR A HARVESTER

(75) Inventors: Bruce Alan Coers, Hillsdale, IL (US); Daniel James Burke, Cordova, IL (US)

(73) Assignee: Deere & Company, Moline, IL (US)

( * ) Notice: Subject to any disclaimer, the term of this patent is extended or adjusted under 35 U.S.C. 154(b) by 2 days.

(21) Appl. No.: 10/021,581

(22) Filed: Dec. 18, 2001

(65) Prior Publication Data

US 2003/0110748 A1 Jun. 19, 2003

(51) Int. Cl.⁷ .............................................. A01D 75/28
(52) U.S. Cl. ................................. 56/10.2 R; 460/6
(58) Field of Search .......................... 460/1, 6, 16, 20, 460/119; 56/10.2 R, 10.2 A, 10.2 G, 10.8, 11.9, DIG. 15; 701/50

(56) References Cited

U.S. PATENT DOCUMENTS

| | | | | |
|---|---|---|---|---|
| 3,606,742 | A | | 9/1971 | Wieneke et al. |
| 4,327,544 | A | * | 5/1982 | McDuffie et al. ............... 460/1 |
| 4,337,611 | A | * | 7/1982 | Mailander et al. ............. 460/7 |
| 4,487,002 | A | * | 12/1984 | Kruse et al. ..................... 460/6 |
| 4,513,562 | A | * | 4/1985 | Strubbe .................... 56/10.2 G |
| 5,795,221 | A | * | 8/1998 | Diekhans ........................ 460/6 |
| 6,036,597 | A | * | 3/2000 | Arner .............................. 460/6 |
| 6,185,990 | B1 | * | 2/2001 | Missotten et al. .............. 73/73 |
| 6,315,658 | B1 | * | 11/2001 | Weber ............................ 460/6 |
| 6,401,549 | B1 | * | 6/2002 | Ohlemeyer .............. 73/861.73 |
| 6,431,981 | B1 | * | 8/2002 | Shinners et al. ................ 460/6 |
| 6,475,081 | B2 | * | 11/2002 | Coers et al. .................... 460/7 |

FOREIGN PATENT DOCUMENTS

| | | |
|---|---|---|
| AU | 200226139 | 9/2002 |
| CA | 960 873 | 1/1975 |
| DE | 14 01 720 | 8/1969 |
| DE | 43 11 054 | 6/1994 |
| DE | 200 01 144 | 8/2000 |
| EP | 0 077 667 | 4/1983 |
| EP | 1 243 173 | 9/2002 |

OTHER PUBLICATIONS

Deere & Company, patent application Ser. No. 09/81,2651, filed Mar. 20, 2001, "Throughput Control for Combines".
Deere & Company, Patent application Ser. No. 09/918,266 titled, filed Jul. 30, 2001, "Harvester Speed Control with Header Position Input".

* cited by examiner

Primary Examiner—Robert E. Pezzuto
Assistant Examiner—Nathan Mammen

(57) ABSTRACT

A harvester with a control system responsive to at least one crop processing variable for automatically controlling forward speed of the harvester includes a crop presence responsive switch connected to an automatic harvester control system. The switch, preferably a proximity switch responsive to movement of the feeder house drum from an empty feeder house limit position, provides a signal in response to crop entering the feeder house for initiating the automatic speed control of the harvester after the header receives the crop and prior to the crop entering the processing structure. The automatic control initiation structure is particularly useful with an automatic combine throughput control and eliminates unstable operation resulting from delayed control initiation. The switch is part of an adjustable down stop mechanism for the feeder house drum.

17 Claims, 5 Drawing Sheets

AUTOMATIC CONTROL INITIATION FOR A HARVESTER

FIELD OF THE INVENTION

The present invention relates generally to agricultural harvesters having computerized controls and, more specifically, to structure and a method for initiating automatic control of a combine.

BACKGROUND OF THE INVENTION

Numerous functions on modern agricultural harvesters are now being controlled automatically. For example, some combines include transducers which sense the amount of material entering the combine and provide signals to a controller to adjust the speed of the combine in response to changes in material to maintain a generally constant throughput. One such device is described in and commonly assigned U.S. patent application Ser. No. 09/812,651 titled THROUGHPUT CONTROL FOR COMBINES filed on Mar. 20, 2001. Throughput can be modified if a harvesting quality variable, such as grain loss or grain damage, differs from a desired quality target range over an extended period of time. In another and commonly assigned application, Ser. No. 09/918,266 entitled HARVESTER SPEED CONTROL WITH HEADER POSITION INPUT and filed Jul. 30, 2001, a conventional speed control adjusts harvester speed as a function of outputs of one or more sensors including a throughput sensor located downstream of the header. However, when the header is lowered, combine speed is immediately lowered to prevent a sudden increase in material downstream of the feeder housing input.

One problem with these and similar types of automatic harvester controls has been proper initiation of the automatic control features. For example, in combines with throughput controls, too much crop can enter the machine and cause unstable operation if automatic control is initiated too late. If the initiation is too early, productivity as well as operating stability can be compromised. A simple and reliable way to initiate automatic operation to avoid throughput variations and instability is required.

SUMMARY OF THE INVENTION

It is therefore an object of the present invention to provide an improved system for initiating automatic control of an agricultural harvester. It is a further object to provide such a system which overcomes the aforementioned problems.

It is another object of the present invention to provide an improved system for initiating automatic control of an agricultural harvester which eliminates or reduces automatic control instabilities and unnecessary slowing of the harvester when no crop is present at the crop processor input.

It is a further object of the invention to provide improved detection structure for providing a signal for initiating an automatic control function on a combine. It is another object to provide such a detection structure which provides an initiation signal in response to entry of crop material into the feeder house. It is yet another object to provide such a structure which also acts as an adjustable down stop for the feeder house drum.

To provide an automatic control system initiation signal, a crop presence signaling device is located between the harvesting platform and the input to the crop threshing and separating assembly to detect entry of crop material into the feeder house and provide an initiation signal to the controller. The controller is responsive to the initiation signal to begin the automatic control. In one embodiment, the signaling device includes proximity switch structure responsive to movement of the drum resulting from crop material entering the feeder house. As the drum moves upwardly with crop entry, the switch structure changes state. The controller recognizes the change of state as an indication that material to be processed soon will be entering the threshing and separating assembly and initiates automatic control in response to the indication. Unnecessary slowing of the combine and decreased productivity which otherwise would occur can be avoided when little or no crop is present at the feeder house drum. Initiation of automatic control is optimized so that crop loss and control instabilities are reduced or eliminated.

These and other objects, features and advantages of the present invention will become apparent to one skilled in the art upon reading the following detailed description in view of the drawings.

DETAILED DESCRIPTION OF THE DRAWINGS

Figure 1:
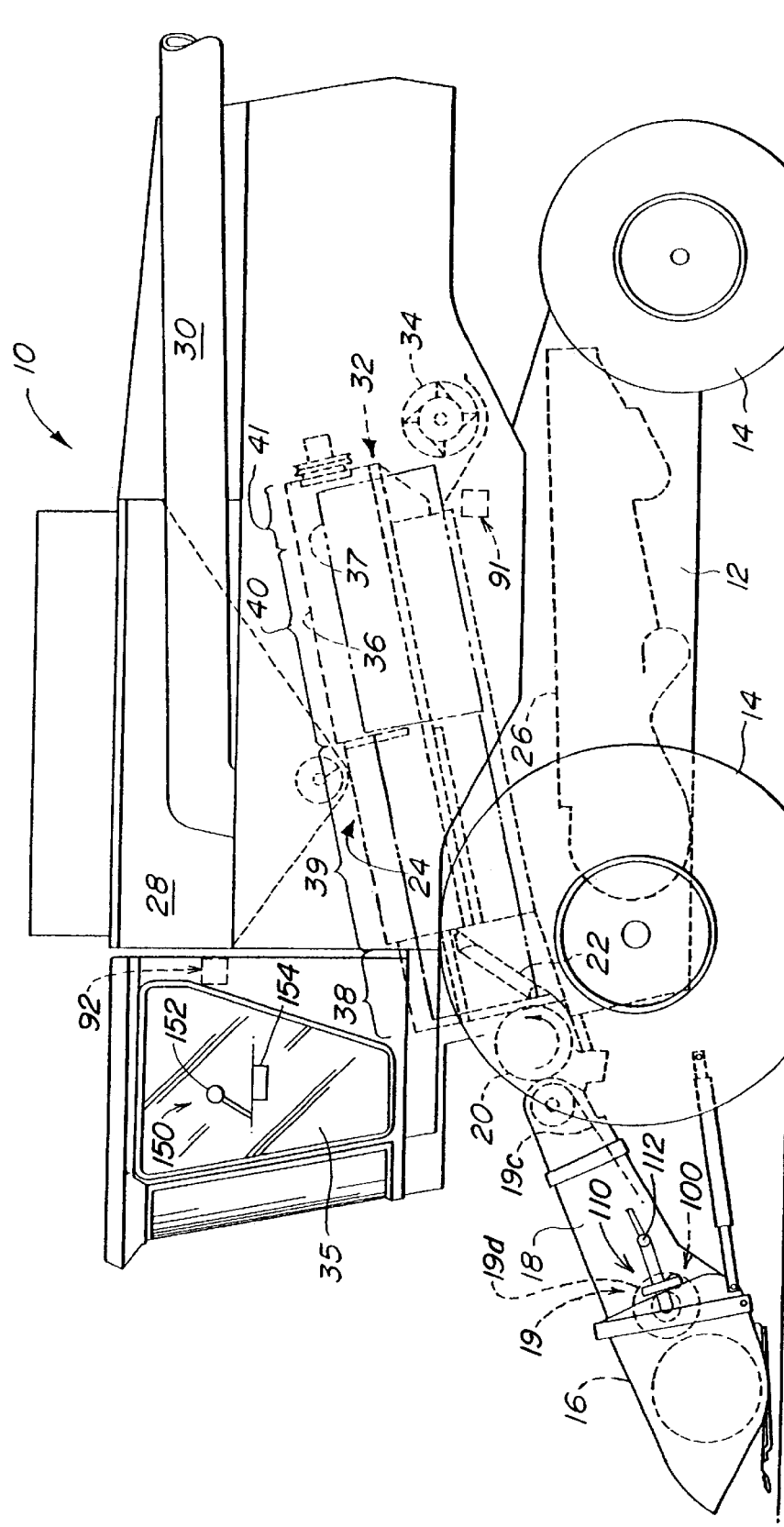
FIG. 1 is a side view of a harvester.

Referring now to FIG. 1 therein is shown an agricultural harvester or combine 10 comprising a supporting structure or frame 12 having ground engaging wheels 14 extending from the supporting structure. Although the combine 10 is illustrated as having wheels it could also have ground engaging full or half tracks. A harvesting platform 16 is used for harvesting a crop and directing it to a feeder house 18 which includes a conveyor 19c trained around a forward drum 19 for moving the harvested crop to a beater 20. The beater 20 directs the crop upwardly through an inlet transition section 22 to a rotary threshing and separating assembly 24. Although the illustrated threshing and separating assembly 24 is axially arranged in the combine 10, other orientations relative to the longitudinal axis of the combine may also be used.

The rotary threshing and separating assembly 24 threshes and separates the harvested crop material. Grain and chaff fall through grates on the bottom of the assembly 24 to a cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater in turn propels the straw out the rear of the combine. It should be noted that the discharge beater 34 could also discharge crop material other than grain directly to a straw chopper. The operation of the combine is controlled from operator's cab 35.

The rotary threshing and separating assembly 24 comprises a cylindrical rotor housing 36 and a rotor 37 located inside the housing 36. The front part of the rotor and the rotor housing define the infeed section 38. Downstream from the infeed section 38 are the threshing section 39, the separating section 40 and the discharge section 41. The rotor 37 in the infeed section 38 is provided with a conical rotor drum having helical infeed elements for engaging harvested crop material received from the beater 20 and inlet transition section 22. Immediately downstream from the infeed section 38 is the threshing section 39. In the threshing section 39 the rotor 37 comprises a cylindrical rotor drum having a number of threshing elements for threshing the harvested crop material received from the infeed section 38. Downstream from the threshing section 39 is the separating section 40 wherein the grain trapped in the threshed crop material is released and falls through a floor grate in the rotor housing 36 to the cleaning system 28. The separating section merges into a discharge section 41 where crop material other than grain is expelled from the rotary threshing and separating assembly 24.

Figure 2:
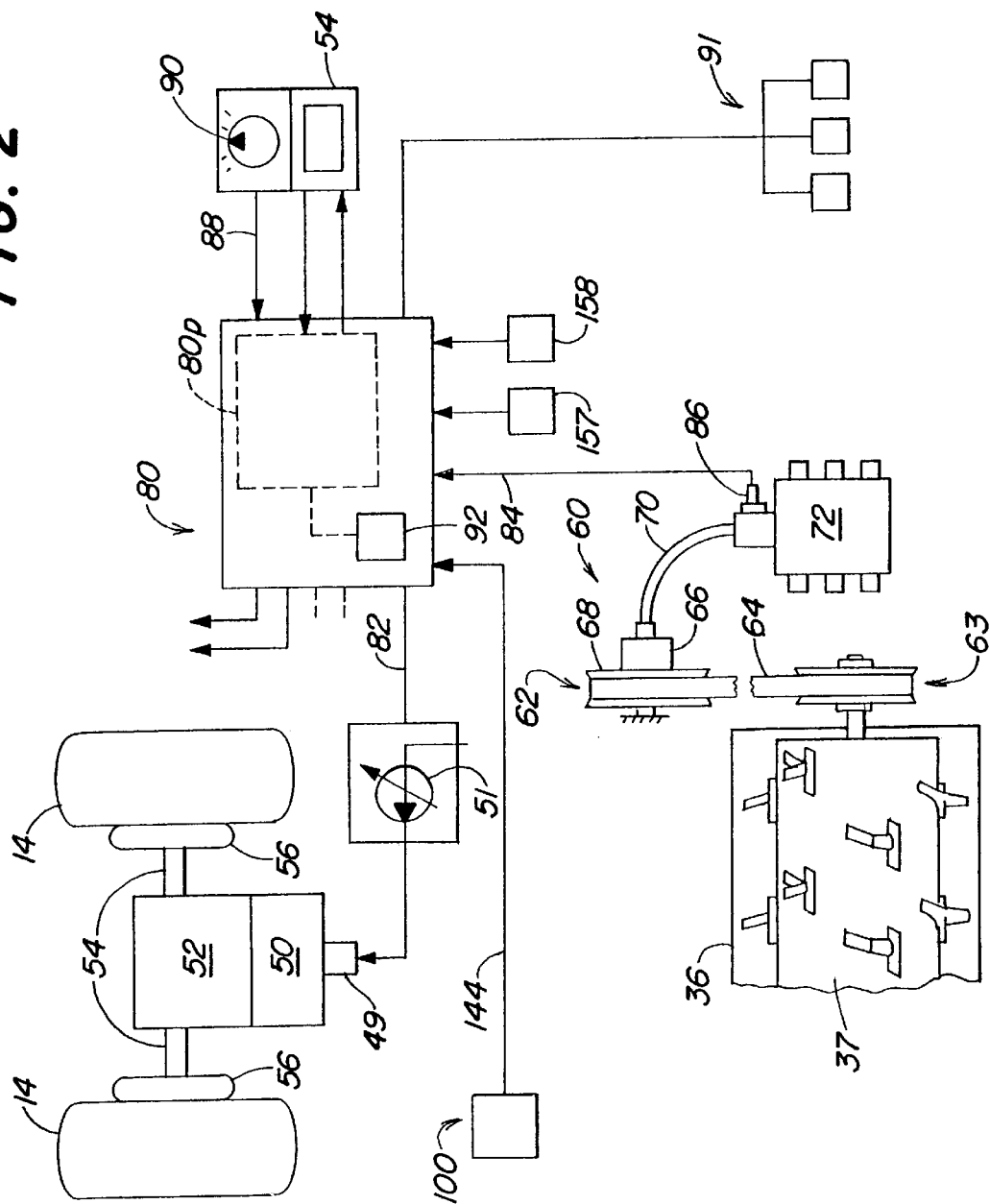
FIG. 2 is a schematic of a control system with throughput control for the harvester of FIG. 1.

The front wheels 14 of the combine 10 are driven by a hydrostatic motor 49 connected to a hydrostatic transmission 50 (FIG. 2). The motor 49 is powered in a conventional manner by an engine-driven hydrostatic pump 51. The pump 51 is provided with adjustable swash plates which control the output speed and direction of rotation of the transmission. Solenoid control valves adjust the positions of the swash plates. The hydrostatic transmission 50 drives a gear box 52, and two live axles 54 extend outwardly from the gear box 52 to driving connections with the final drives 56 of the front wheels 14. The steerable rear wheels 14 can also be driven by wheel motors directly mounted to the wheels. Wheel speed can be controlled by the throughput control system discussed below.

A variable torque sensing drive 60 drives the rotor 37. The same internal combustion engine that drives the hydrostatic transmission 50 drives the variable torque sensing belt drive 60. The drive 60 includes a variable diameter drive sheave 62 and a variable diameter driven sheave 63. A belt 64 extends between the drive sheave 62 and the driven sheave for transmitting rotational power to the rotor 37. A hydraulic cylinder 66 controls the diameter of the drive sheave 62, and the driven sheave 63 is spring loaded to maintain belt tension. The hydraulic cylinder 66 is coupled to the drive sheave 62 and moves face plates 68 of the sheave 62 in and out to control the effective diameter of the sheave relative to the belt 64. By changing the effective diameter of the sheave 62 the effective speed of the driven sheave is changed. Pressurized hydraulic fluid is directed through hydraulic line 70 to the hydraulic cylinder 66 from a valve stack 72. The rotor 37 is driven at a constant selected rotor speed by the variable diameter sheaves. The torque transmitted by the belt 64 and sheaves varies as crop material throughput varies.

An electronic controller 80 regulates the harvesting speed of the combine 10 by controlling the solenoid control valves on the hydrostatic pump 51 via line 82 to adjust the positions of the swash plates in the pump. The controller 80 receives an actual hydraulic pressure signal, or rotor variable drive actuator pressure (RVDAP), through line 84 from hydraulic pressure sensor 86. RVDAP is a function of the feedrate, and feedrate tends to remain generally constant with constant RVDAP. Therefore, by controlling the harvester speed to maintain a preselected RVDAP, throughput remains generally constant. Hydraulic pressure sensor 86 senses the hydraulic pressure in the variable torque sensing drive 60. Hydraulic pressure in the variable torque sensing drive 60 is related to throughput which, in turn, affects harvest quality variables such as grain loss, grain damage and dockage.

The controller 80 receives a desired harvest quality level signal input, such as an acceptable grain loss rate, via line 88 from an operator control 90 in the cab 35 or other entry device. A harvest quality transducer 91, which is shown in FIG. 1 as a grain loss sensor located near the outlet 32, provides harvest quality signals to the controller 80. A harvester tilt sensor or transducer 92 is supported at a convenient location on the frame 12 (FIG. 1) and provides signals to the controller 80 indicative of the amount of harvester tilt away from a generally level or horizontal position which is shown in FIG. 1. Preferably, the transducer 92 provides side-to-side tilt angle and front-to-back tilt angle information to the controller 80. As shown in FIG. 2, the transducer is integrated directly into the circuit board of the controller 80 to avoid the expense of an external sensor, a separate enclosure and a wiring harness.

To provide an automatic control system initiation signal, a crop presence signaling device 100 is located between the harvesting platform 16 and the input to the crop threshing and separating assembly 24. The structure 100 is responsive to crop in the feeder house 18 and provides an initiation signal to the controller 80. The controller 80 is responsive to the initiation signal to begin the automatic control. As shown, the device 100 includes proximity switch structure responsive to movement of the drum 19d resulting from crop material entering the feeder house 18. As the drum moves upwardly with crop entry, the switch structure changes state. The controller 80 recognizes the change of state as an indication that material to be processed soon will be entering the assembly 24.

As shown, the crop signaling device 100 comprises a portion of drum adjustment structure indicated generally at 110. The drum 19d is supported at its ends from the sides of the feeder house 18 by adjustable length links 112 having turnbuckles for adjusting the tension on the feeder house conveyor chain 19c. The conveyor chain 19c is trained around the drum 19d and moves crop material rearwardly and upwardly along the floor of the feeder house to the beater 20. The links 112 allow the drum 19d to move vertically with entry of crop material. The ideal initial clearance between the drum 19d and the feeder house floor varies for different crops. For example, optimum clearance for small grains will be less than that for ear corn, and the adjustment structure 110 provides different down stop limits.

Figure 3:
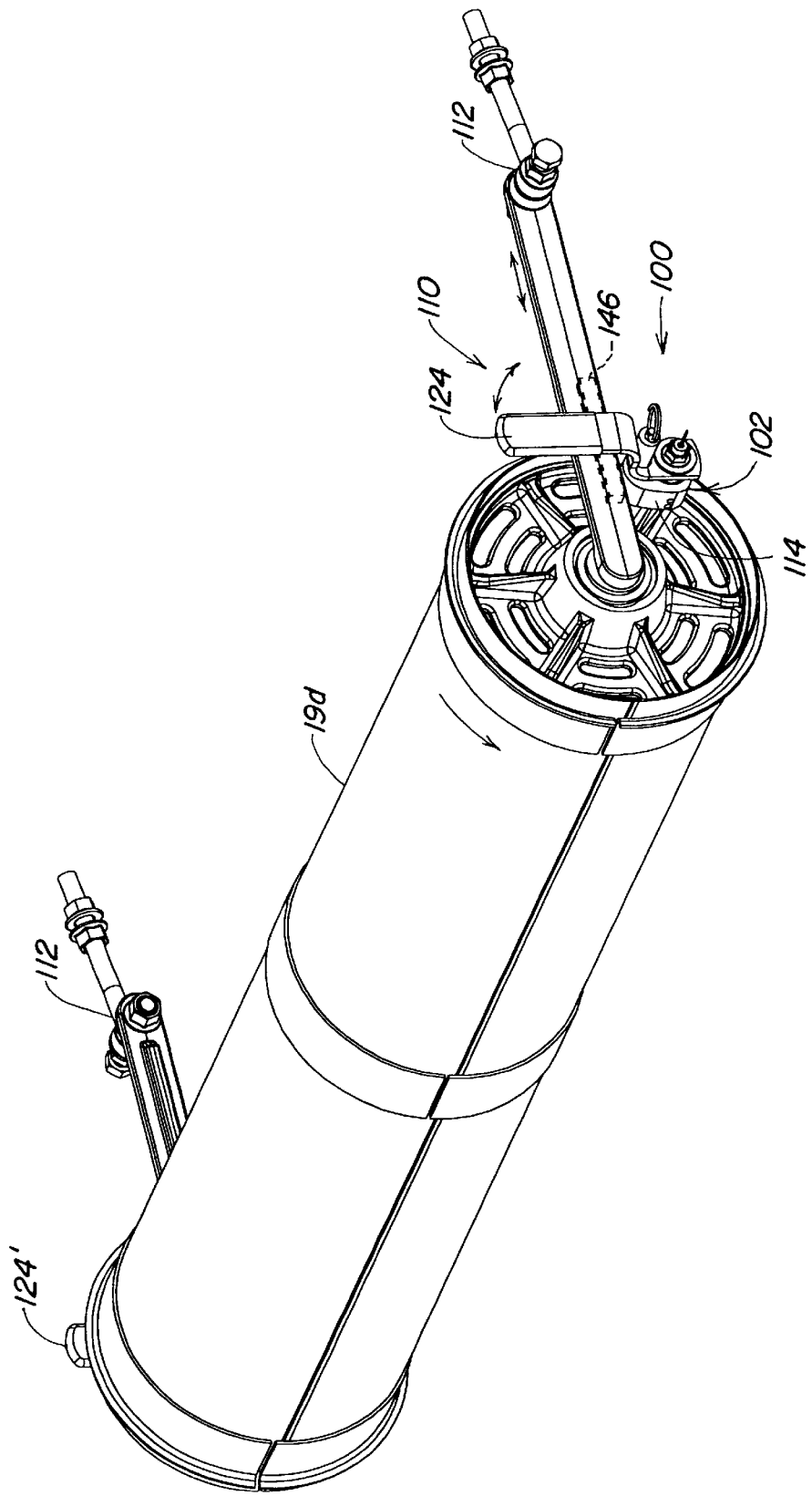
FIG. 3 is a side perspective view of a portion of the feeder house of the harvester of FIG. 1 showing an adjustable drum stop with a switch for providing automatic control initiation.
Figure 4:
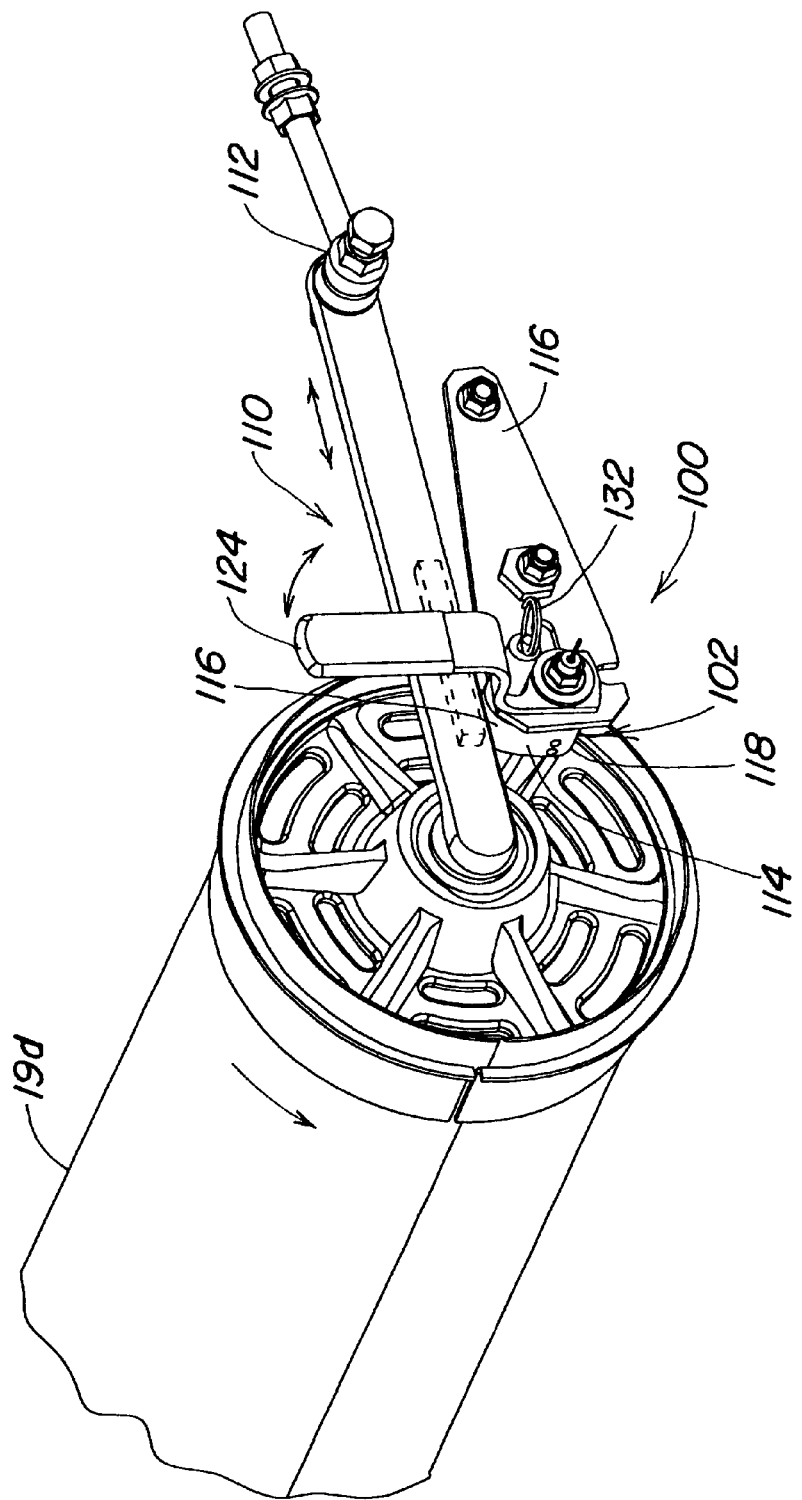
FIG. 4 is an enlarged view of a portion of the feeder house of FIG. 3 showing the stop-mounted switch.
Figure 6:
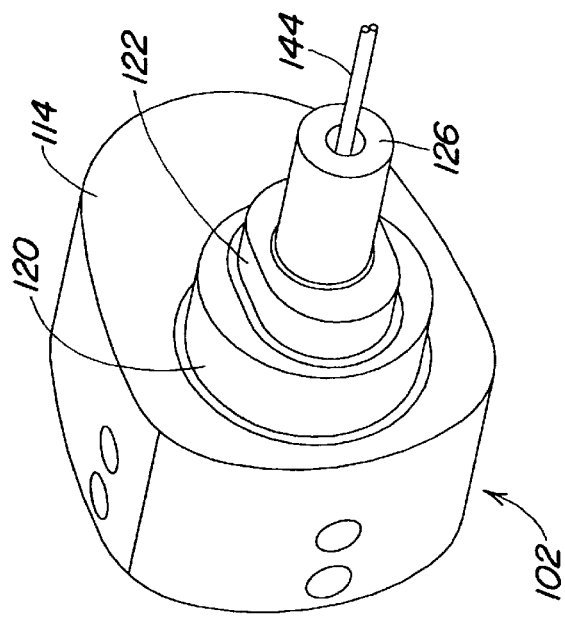
FIG. 6 is a perspective view of the stop and switch shown in FIG. 5 taken from the opposite or outwardly facing side of the switch.
Figure 5:
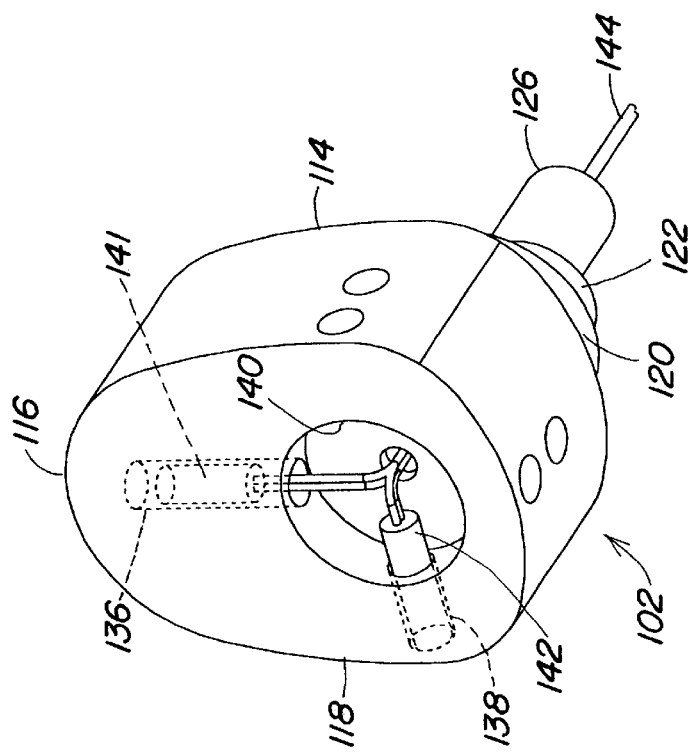
FIG. 5 is a perspective drum-side view of the stop and switch of FIG. 3.

The adjustment structure 110 includes a cam 114 rotatably supported by a bracket 116 bolted to the side wall of the feeder house 18. The cam 114 includes a radially outermost lobe 116 and a second lobe 118 located radially inwardly and offset ninety degrees from the lobe 116. The lobe 116 extends upwardly for contacting the bottom of the link 112 when the structure 110 is set for ear corn. The lobe 118 extends upwardly for providing a down stop limit when the structure 110 is set for crop other than ear corn. The cam 114 includes an axially extending bearing portion 120 rotatably received within an aperture of the bracket 116. A non-circular portion 122 extends axially outwardly from the bearing portion 120 and receives an adjustment handle 124 having a mating aperture. A hollow threaded portion 126 extends axially outwardly from the portion 122, and a nut and washer assembly 128 is threaded onto the portion 126 against the handle 124 to maintain the structure 110 on the bracket 116. The angular position of the handle 124 corresponds to the angular position of the radially outermost lobe 116. To adjust the down stop limit of the drum 19d, the handle is rotated between the uppermost position shown in FIGS. 3 and 4 wherein the lobe 116 contacts the link 112 and a lowermost position (ninety degrees in the clockwise direction from the position shown in FIGS. 3 and 4) wherein the lobe 118 contacts the link. To secure the handle 124 in the selected down stop position, a quick attach pin 132 is positioned through an aperture in the handle and a corresponding slot in the bracket 116.

The cam 114, which preferably is fabricated from stainless steel, includes two bores 136 and 138 extending generally towards the respective lobes 116 and 118 from a central cavity 140. Magnetically operated reed switches 141 and 142 are supported within the bores 136 and 138 and include electrical lead-in wires 144 which extend axially through the hollow portion of the cam 114 and are connected to an input of the processor 80. An elongated magnet 146 is supported at the lower, inside edge of the link 112 for actuating the reed switch 141 or 142 when the link is in the stopped position resting on the lobe 136 or 138, respectively. The magnet extends along sufficient length of the link to assure reed switch operation for the entire range of adjustment of the link.

An operator's console 150 located in the cab 35 includes conventional operator controls including a hydro shift lever 152 for manually controlling the speed range and output speed of the hydrostatic transmission 50. An operator interface device 154 in the cab 35 facilitates entry of information into a processor system 80p to provide automatic speed control and numerous other control functions for the harvester 10. Readouts from various on-board sensors 157 and microcontrollers 158 are provided by the device 154. The operator can enter various types of information via input lines 88 and 154a, including crop type, location, yield, and acceptable grain loss, damage and dockage and the like.

For combine operation, a desired harvest quality variable such as loss rate is input to the controller 80 using the operator control 90. Based upon initial setup entries or upon learned correlation the controller 80 calculates an initial target RVDAP for the setting on the control 90. If automatic control is desired, the operator selects the automatic control function through a switch on the console 150. As the harvesting platform 16 or other gathering device on the combine receives crop material and moves it into the feeder house 18, the drum 19d raises from the cam 114 to change the state of the reed switch 141 or 142 and provide an initiation signal to the processor 80 for starting automatic operation.

The controller 80 receives the actual pressure signal from the sensor 86 and an actual loss rate signal or other harvest quality signal from the transducer 91 and regulates the forward speed of the combine so that the RVDAP is established at the initial target level. The controller polls the transducer 91 and determines if the loss rate for the initial target RVDAP while the combine is operating in a level condition is at the desired level. If over an extended period of time the loss rate is greater than set by the control 90 for the initial target RVDAP, the target RVDAP is gradually reduced by reducing combine speed until the desired loss rate is reached, and a new RVDAP is established. If the loss rate over an extended period of time is less than the entered rate, target RVDAP is gradually increased by an increase in combine speed until the desired rate is achieved. The controller 80 continually updates the target RVDAP for level operation during harvesting to compensate for changing conditions.

If the combine tilts from the level condition and the controller 80 receives a tilt signal from the transducer 92, the controller 80 will slow the combine 10 to decrease throughput to thereby prevent an increase in the harvest quality variable. By monitoring the signal from the device 100, slowing of the combine can be delayed if the signal indicates that little or no crop material is present in the feeder house 18.

The processor 80p stores or calculates information correlating expected quality variable as a function of tilt angles and throughput. Therefore, for a given tilt angle, the target RVDAP can be modified to change combine speed so the quality variable will remain generally constant. In one embodiment of the invention, the processor 80p learns the correlation between tilt, harvest quality and throughput and continually updates the stored information so that throughput adjustments can be made quickly and accurately, even in changing crop and harvesting conditions.

Throughput is measured as a function of RVDAP (transducer 86) and remains fairly constant with constant RVDAP. During operation of the combine, RVDAP is continually monitored. If RVDAP deviates from the desired range, combine speed is increased or decreased, depending on whether RVDAP is below or above the target level. Also, the tilt transducer 92 is polled to determine if the combine is tilting away from a level condition. If combine tilt is detected, the processor determines a relationship between loss, RVDAP and tilt to define a correlation equation or store in memory a map of the relationship between loss and RVDAP as a function of tilt. When machine tilt is detected and increased loss (or other deterioration of harvest quality) is detected, the processor 80p modifies the target RVDAP. This process allows the controller 80 to adjust speed until the processor identifies the correct correlation between tilt, loss and RVDAP and can maintain a constant loss by momentarily modifying the target according to the learned correlation.

By constantly monitoring the signal from the device 100, unnecessary slowing of the combine and decreased productivity which otherwise would occur when the processor 80 recognizes certain conditions can be avoided when little or no crop is present at the feeder house drum 19d. Initiation of automatic control can be optimized by monitoring the signal from the reed switches 141 and 142 so that crop loss and control instabilities are reduced or eliminated.

Having described the preferred embodiment, it will become apparent that various modifications can be made without departing from the scope of the invention as defined in the accompanying claims.

What is claimed is:

1. A harvester supported for forward movement over a field of crop to be harvested having processing structure located on the harvester, a feeder house including a housing and a drum supporting a leading end of a conveyor for moving the crop to the processing structure, link structure supporting the drum for vertical movement relative to the housing, the drum moving vertically in response to crop engaging the leading end of the conveyor, the harvester including a control system responsive to a crop processing variable for automatically controlling the harvester, an adjustment mechanism for adjusting the drum relative to the housing, and switch structure supported by the adjustment mechanism and responsive to vertical movement of the drum to provide a crop presence signal indicative of presence of crop in feeder house and wherein the control system is responsive to the signal for initiating the automatic control of the harvester when crop is present at the leading end of the conveyor.

2. The harvester as set forth in claim 1 including a combine tilt sensor connected to the control system for slowing the forward movement a predetermined amount when combine tilt from a horizontal position is detected, wherein the control system is responsive to the crop presence signal to modify the predetermined amount of slowing when a substantial amount of crop is not present in the feeder house.

3. The harvester as set forth in claim 1 wherein the control system includes a crop throughput control for varying the speed of the harvester to control the crop throughput, and the control system is responsive to the entry of crop in the housing to initiate throughput control.

4. A harvester supported for forward movement over a field of crop to be harvested having processing structure located on the harvester, a feeder house including a housing and a drum for moving the crop to the processing structure, the harvester including a control system responsive to a crop processing variable for automatically controlling the harvester, and switch structure responsive to presence of crop in the feeder house and connected to the control system for initiating the automatic control of the harvester, an adjustment mechanism for adjusting the drum relative to the housing, wherein the switch structure is supported by the adjustment mechanism, and wherein the adjustment mechanism comprises a cam member, and the switch structure comprises a proximity switch supported by the cam member.

5. The harvester as set forth in claim 4 including a movable arm supporting the drum, and a magnet supported by the arm for operating the proximity switch.

6. The harvester as set forth in claim 5 wherein the rotating cam member comprises a stop for the movable arm.

7. The harvester as set forth in claim 6 including an adjustment handle connected to the cam member for rotating the cam member and changing the position of the stop.

8. A harvester supported for forward movement over a field of crop to be harvested, processing structure located on the harvester, a header for receiving the crop, a feeder house including a housing for receiving the crop from the header and directing the received crop to the processing structure, the harvester including a control system responsive to at least one crop processing variable for automatically controlling forward speed of the harvester, and crop.presence responsive structure connected to the control system and providing a signal in response to crop in the feeder house for initiating the automatic control of the harvester after the header receives the crop and prior to the crop entering the processing structure, wherein the harvester includes a crop conveyor having a forward end trained around a drum and a rearward end feeding crop to the processing structure, a drum support facilitating movement of the drum relative to the housing in response to crop engaging the forward end, and wherein the crop responsive structure comprises switch structure connected to the drum and responsive to the movement of the drum to provide an initiation signal prior to the crop engaging the rearward end.

9. The harvester as set forth in claim 8 wherein the control system includes a throughput sensor and the crop processing variable comprises processor throughput.

10. The harvester as set forth in claim 8 wherein the switch structure comprises a switch having an output state dependent on drum position relative to the housing.

11. The harvester as set forth in claim 10 including an adjustable drum stop and wherein the switch is supported by the drum stop.

12. The harvester as set forth in claim 11 wherein the switch comprises proximity switch structure.

13. The harvester as set forth in claim 12 including an arm member adjustably supporting the drum and contacting the drum stop, and wherein the proximity switch structure includes a magnet and a magnetically operated switch connected to the arm and the drum stop.

14. A method of initiating automatic control of a combine having a header, crop processing structure, a feeder house including a housing for moving the crop from the header to the processing structure, and a control system responsive to a crop processing variable for automatically controlling movement of the header relative to the crop in a field, the method of initiating including the steps of:

detecting presence of crop entering the feeder house including supporting a forward end of a conveyor for movement relative to the feeder housing; engaging crop with the forward end of the conveyor to move the crop towards the processing structure; and detecting the movement of the forward end of the conveyor as the crop enters the feeder house; and automatically initiating automatic header movement control in response to the detecting of the movement of the forward end relative to the feeder house;

wherein the step of supporting a forward end of a conveyor includes supporting a conveyor chain from a feeder house drum, and the step of detecting the movement includes detecting vertical movement of the feeder house drum resulting from entry of the crop into the feeder house, wherein the step of detecting the vertical movement of the feeder house comprises actuating a signaling device in response to movement of a feeder house drum from a stop position assumed when the feeder house is generally devoid of crop.

15. The method as set forth in claim 14 wherein the step of detecting the presence of crop entering the feeder house comprises magnetically actuating a switch connected to the control system.

16. The method as set forth in claim 14 wherein the step of automatically initiating automatic header movement control comprises initiating combine speed control to adjust forward speed of the header and resulting combine throughput.

17. A method of initiating automatic control of a combine having a header, crop processing structure, a feeder house for moving the crop from the header to the processing structure, and a control system responsive to a crop processing variable for automatically controlling movement of the header relative to the crop in a field, the method of initiating including the steps of:

detecting presence of crop entering the feeder house;

automatically initiating automatic header movement control in response to the detecting of the presence of crop entering the feeder house;

wherein the step of automatically initiating automatic header movement control comprises initiating combine speed control to adjust forward speed of the header and resulting combine throughput; and including the step of adjusting forward speed of the header and resulting combine throughput at least partially in response to changing combine tilt angle and in response to the step of detecting presence of crop entering the feeder house.

* * * * *